United States Patent

Rudolf et al.

[11] Patent Number: 5,941,559
[45] Date of Patent: Aug. 24, 1999

[54] AIRBAG FOR MOTOR VEHICLES

[75] Inventors: Harald Rudolf, Tübingen; Ulrich Tschäschke, Ehningen, both of Germany

[73] Assignee: Mercedes-Benz AG, Stuttgart, Germany

[21] Appl. No.: 08/821,622

[22] Filed: Mar. 24, 1997

[30] Foreign Application Priority Data

Mar. 23, 1996 [DE] Germany ............... 196 11 541

[51] Int. Cl.⁶ .................................................. B60R 21/24
[52] U.S. Cl. ......................................... 280/729; 280/743.1
[58] Field of Search .................... 280/729, 743.2, 280/743.1, 730.1, 731, 732, 740

[56] References Cited

U.S. PATENT DOCUMENTS

| | | | |
|---|---|---|---|
| 3,727,942 | 4/1973 | Arntson et al. | 280/731 |
| 3,795,414 | 3/1974 | Ventre et al. | 280/730.1 |
| 5,366,241 | 11/1994 | Kithil | 280/730.1 |

FOREIGN PATENT DOCUMENTS

| | | |
|---|---|---|
| 0496566A1 | 7/1992 | European Pat. Off. . |
| 0593172A1 | 4/1994 | European Pat. Off. . |
| 2099107 | 3/1972 | France . |
| 2109477 | 5/1972 | France . |
| 3833888A1 | 4/1990 | Germany . |
| 9211421 U | 3/1993 | Germany . |
| 4240760A1 | 6/1993 | Germany . |
| 4308387A1 | 9/1993 | Germany . |
| 49-5824 | 1/1974 | Japan . |
| 61-182353 | 11/1986 | Japan . |
| 1-247242 | 10/1989 | Japan ................................. 280/743.2 |
| 1-311930 | 12/1989 | Japan ..................................... 280/729 |
| 2-286448 | 11/1990 | Japan . |
| 3-292237 | 12/1991 | Japan ................................. 280/743.2 |
| 4-244453 | 9/1992 | Japan . |
| 6-1188 | 1/1994 | Japan ................................. 280/743.2 |
| 6-32197 | 2/1994 | Japan . |
| 6-64490 | 3/1994 | Japan ................................. 280/743.2 |
| 1 362 672 | 8/1974 | United Kingdom . |

OTHER PUBLICATIONS

Search Report, European Patent Office, Application No. 97102186.0, Jul. 21, 1997.

*Primary Examiner*—Peter C. English
*Attorney, Agent, or Firm*—Evenson, McKeown, Edwards & Lenahan P.L.L.C.

[57] ABSTRACT

An airbag for motor vehicles comprises an airbag sheath and an inner airbag that is inflated before the airbag sheath and, by virtue of its design, is prepared for deliberate filling with gas in the direction of the passenger, with the inner airbag having a cross section that decreases uniformly in the direction of the passenger, to aim the gas stream toward the passenger.

19 Claims, 3 Drawing Sheets

AIRBAG FOR MOTOR VEHICLES

BACKGROUND OF THE INVENTION

This application claims the priority of German application 196 11 541.8-21 filed in Germany on Mar. 23, 1996, the disclosure of which is expressly incorporated by reference herein.

The invention relates to an airbag for motor vehicles having an airbag sheath and an inner airbag that is inflated before the airbag sheath and is designed by virtue of its shape for filling with gas in a specific direction.

An airbag in a motor vehicle is known from German Patent Document DE 43 08 387 A1 in the sheath of which airbag a gas flow guiding part is provided in the form of an inner airbag or a wide internal belt. The inner airbag is filled before the airbag sheath and is intended to guide the incoming gas stream transversely with respect to the front of the airbag sheath and toward its side parts first, expanding the diameter of the airbag sheath rapidly, with expansion in the direction of the passenger taking place only later.

German Patent Document No. DE 92 11 421 U1 describes an airbag comprising an inner airbag that is blown up first and remains filled longer. Hence the airbag sheath serves as protection for the primary impact while the inner airbag is intended to catch the passenger in a secondary impact.

An airbag with an airbag sheath and an inner airbag is known from European Patent Document EP 0 496 566 A1, said inner airbag serving to protect the airbag sheath from incoming hot gases.

European Patent Document EP 0 593 172 A1 describes an airbag with two chambers divided by a chamber partition in the form of a restraint, with a first chamber initially expanding in the direction of the passenger in a collision in order to catch his upper body. Then gas passes through the valves provided in the chamber partition and into the second chamber as a result of the continued pressure rise in the airbag, said second chamber, when inflated, capturing the head and shoulders of the passenger.

SUMMARY OF THE INVENTION

An object of the invention is providing an airbag assembly of the above-mentioned type which catches a passenger in a collision in proper time and with sufficient resistance.

In a known airbag with a one-piece airbag sheath, the gas stream expands in the form of a cone with decreasing speed. The inner airbag according to the invention on the other hand, with a cross section that tapers uniformly toward the passenger, steers the gas stream in bundled form and with a higher propagation rate toward the passenger. Consequently, the passenger is caught early by the more rapidly unfolding inner airbag and can promptly participate in the deceleration of the vehicle so that the loads imposed on the head and chest in a collision are reduced. The risk of the airbag bursting against the interior trim as a result of an early impact, with a passenger who is not belted in for example, can be offset by the prompt provision of the necessary internal supporting pressure by the inner airbag inside the airbag sheath.

The faster and/or earlier filling of the inner airbag is favored by the fact that the ratio of its inlet cross section to its filling volume is larger than the corresponding ratio of the inlet cross section to the filling volume of the airbag sheath. Another possible way of accelerating filling is by making the inlet cross section of the inner airbag larger than that of the airbag sheath.

The inner airbag can extend from the gas outlet opening at the gas source to the opposite impact area of the airbag sheath where the collision occurs and can be permanently sewn thereto, so that the airbag sheath reaches its desired maximum extent in the direction of the passenger simply as a result of the filling of the inner airbag. The seam closes off the volume of the inner airbag from rapid filling. The inner airbag can also assume the function of a restraint that holds the airbag sheath in a desired shape. A seam that runs all the way around keeps the inner airbag connected with the airbag sheath under stress without sharp stress peaks in individual sewn compartments.

The inner airbag can also fulfill its function of filling rapidly with gas in a specific direction even before it reaches the impact surface of the airbag sheath, but stops earlier, in other words for example it has a contour that is frustocoiucal or in the shape of a truncated pyramid. The required internal pressure in the inner airbag can also be produced with an opening at the end that is close to the impact surface and kept open. On the other hand, it is also helpful for rapid filling to close the inner airbag with a flat lid that extends approximately perpendicularly to the length of the inner airbag and is fastened thereto. As far as the application is concerned, therefore, it is possible to secure the inner airbag near the gas source or near the impact surface where contact with the airbag sheath occurs, by giving it a lengthwise dimension that is shorter than the lengthwise dimension of the airbag sheath, as well as by providing an airbag that extends over the entire length of the airbag sheath.

The inner airbag, with its conical shape, is simple to manufacture, with its inlet cross section for the entry of the gas nevertheless being made rectangular to match the usually rectangular container. A coaxial arrangement of the inner airbag inside the airbag sheath also results in uniform filling of the inner airbag as well as the airbag sheath.

To reinforce the filling of the airbag sheath, in addition to the entry of the gas at its inlet cross section, the inner airbag can be made gas-permeable, with the material used being permeable to gas above a certain internal pressure or by the inner airbag being provided with special gas outlet openings or tear seams through which gas can flow from the inner airbag into the airbag sheath after a predetermined time. It is also possible to filter the gas that enters the airbag sheath from the inner airbag and thereby keep the combustion residues of a gas generator which are perceived as unpleasant by the passengers away from them.

An airbag according to the invention is especially advantageous when used as a passenger airbag since in this case the inner airbag ensures prompt support even if the required large volume of the airbag sheath has not yet been filled completely.

Other objects, advantages and novel features of the present invention will become apparent from the following detailed description of the invention when considered in conjunction with the accompanying drawings.

DETAILED DESCRIPTION OF THE DRAWINGS

Figure 1:
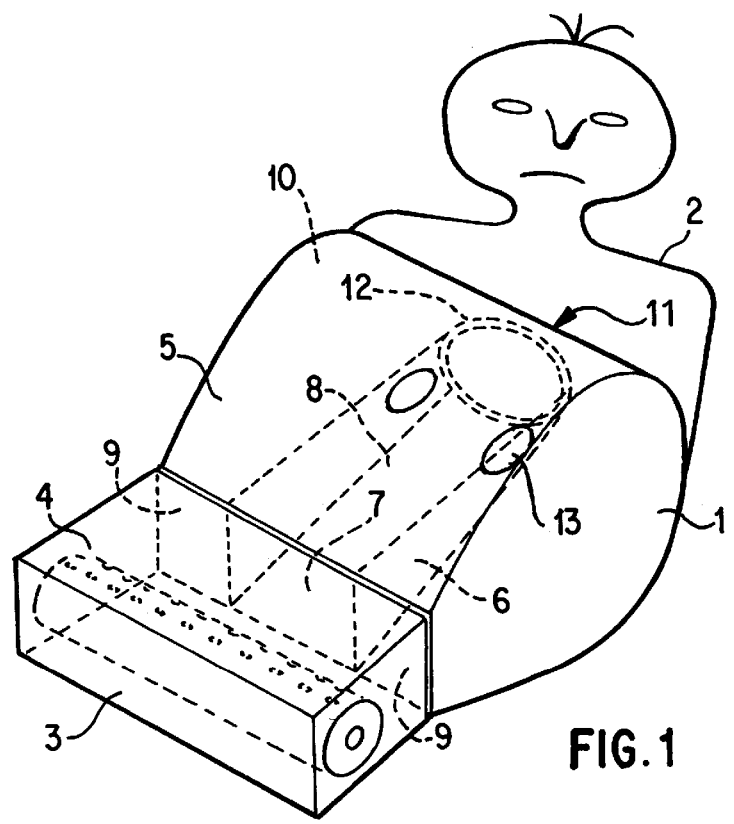
FIG. 1 shows in a diagonal perspective view an airbag sheath with an inner airbag having gas passage openings.
Figure 2:
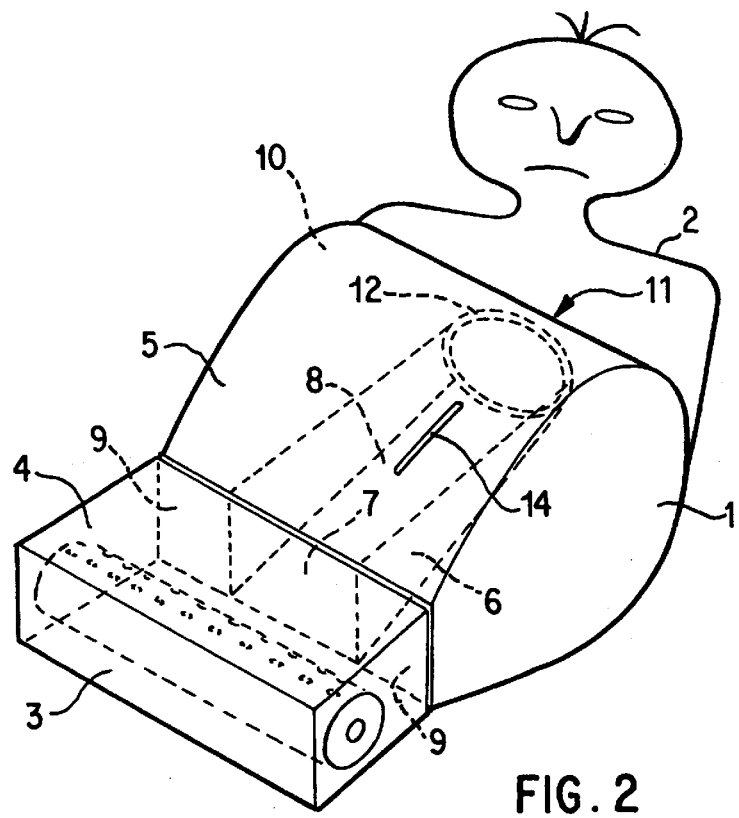
FIG. 2 shows in a diagonal perspective view an airbag sheath with an inner airbag having a tear seam.

FIGS. 1 to 5 show, in a diagonal view from the rear, an airbag 1, 1' that has deployed in a collision toward a passenger 2, 2' and is presented inflated before him to protect him against a hard impact. Airbag 1, 1', in the resting state not shown here in greater detail, is stored folded up in a container 3, 3' to which it is also fastened by the edge of its opening, with container 3, 3 ' being recessed for example in a steering wheel, an instrument panel, or a side wall of the vehicle. In container 3, 3', a gas source 4, 4', designed here as a gas generator, is also accommodated which in a collision supplies the flow of gas that results in the deploying and filling of airbag 1, 1'.

Airbag 1, 1' according to the invention has an inner airbag 6, 6' inside an outer airbag sheath 5, 5'. This inner airbag 6, 6' is inflated rapidly and deliberately in the direction of passenger 2, 2' in a collision as a result of its uniformly tapered cross section by the gas flow from gas source 4, 4'. As a result, passenger 2, 2' is promptly caught by inner airbag 6, 6' which fills up more rapidly than airbag sheath 5, 5 ' and can participate promptly in the deceleration of the vehicle in a collision, with the stress on head and chest being reduced. The risk of airbag 1, 1' bursting against the interior trim as a result of an early impact with a passenger 2, 2' who was not belted in for example can be offset by the prompt provision of the internal pressure required for support by inner airbag 6, 6' within airbag sheath 5, 5'. Inner airbag 6, 6' provides a direct and bundled volume flow of gas toward passenger 2, 2' and can be filled and deployed rapidly because of its limited volume. In contrast to the gas stream that expands in spherical airbag sheath 5, 5' with decreasing speed, the propagation rate is increased in this inner airbag 6, 6' so that filling is completed faster and passenger 2, 2' can be restrained by filled inner air bag 6, 6' at a particularly early point in time.

This airbag 1, 1' is especially advantageous when used as a passenger (non-driver) airbag, since in this case inner airbag 6, 6' ensures early support even when the required large volume of airbag sheath 5, 5' has not yet been filled completely. Rapid filling of entire airbag 1, 1' with the resultant development of considerable force against passenger 2, 2' can be avoided as a result.

In FIG. 1, inner airbag 2 extends from inlet cross section 9 of airbag sheath near gas source 4 to an opposite impact surface 11, near the point of contact of air bag sheath 5 where inner airbag 2 is sewn to airbag sheath 5 by a seam 12 that runs all the way around. The seam closes off the volume of inner airbag 6 for rapid filling. In this case, airbag sheath 5 has already attained its desired maximum extent in the direction of passenger 2 as a result of the filling of inner airbag 6. Inner airbag 6, because of its lengthwise extent, can therefore replace a conventional restraint that holds airbag sheath 5 in a desired shape. Circumferential seam 12 holds inner airbag 6 in contact with airbag sheath 5 without large stress peaks occurring in individual sewn compartments under stress.

Inner airbag 6 and airbag sheath 5 in this case are supplied with a gas stream from gas source 4. Airbag sheath 5 however can be filled exclusively or additionally with gas from inner airbag 6 according to other contemplated embodiments of the invention. Inner airbag 6 in this case can consist of a material that is gas-permeable above a certain internal pressure. In addition, inner airbag 6 may have special gas passage openings 13 (FIG. 1), tear seams 14 (FIG. 2), or a filter fabric 15 (FIG. 3), through which gas from inner airbag 6 can flow into airbag sheath 5 after a predetermined interval or after a certain internal pressure has been reached.

Figure 3:
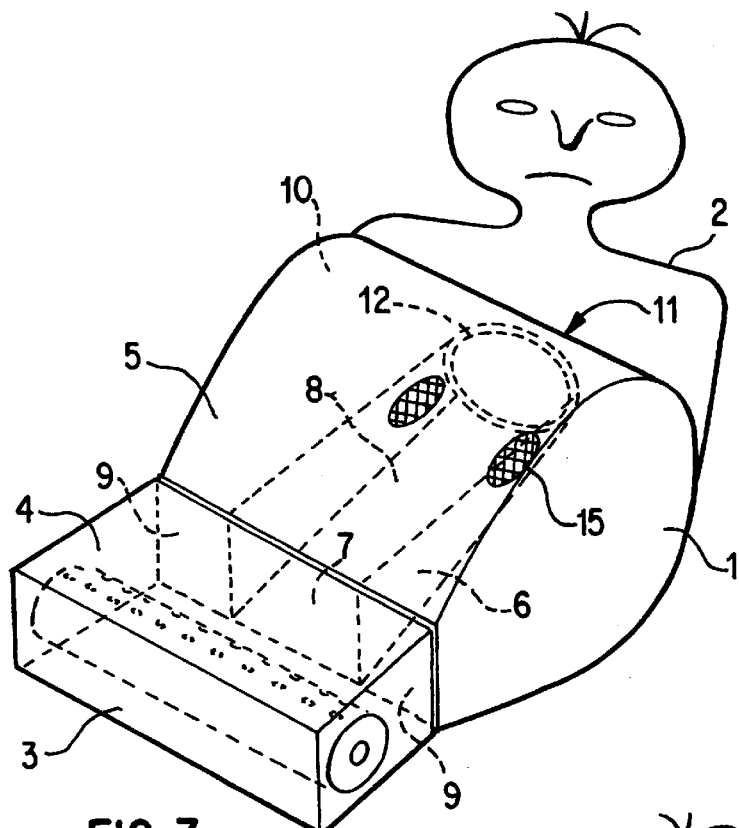
FIG. 3 shows in a diagonal perspective view an airbag sheath with an inner airbag having filter fabric.

It is possible to filter the gas that enters airbag sheath 5 from inner airbag 6, with the gas flowing through the filter fabric 15 shown in FIG. 3, so that the combustion residues of the gas generator that are perceived as unpleasant by passengers 2 are held back.

For more rapid and/or earlier filling of inner airbag 6, the ratio of its inlet cross section 7 for the gas flow from gas source 4 to its filling volume 8 is larger than the corresponding ratio of inlet cross section 9 to filling volume 10 for airbag sheath 5. Another possibility for accelerating filling is provided by an inlet cross section 7 of inner airbag 6 that is larger than inlet cross section 9 of airbag sheath 5. Inner airbag 6 with its conical shape is simple to manufacture, while being made rectangular where it joins usually rectangular container 3 with its inlet cross section 7 for gas entry. An arrangement of inner airbag 6 that is directed coaxially in the lengthwise direction toward passenger 2 in airbag sheath 5 also results in a uniform filling of inner airbag 6 as well as airbag sheath 5.

Figure 4:
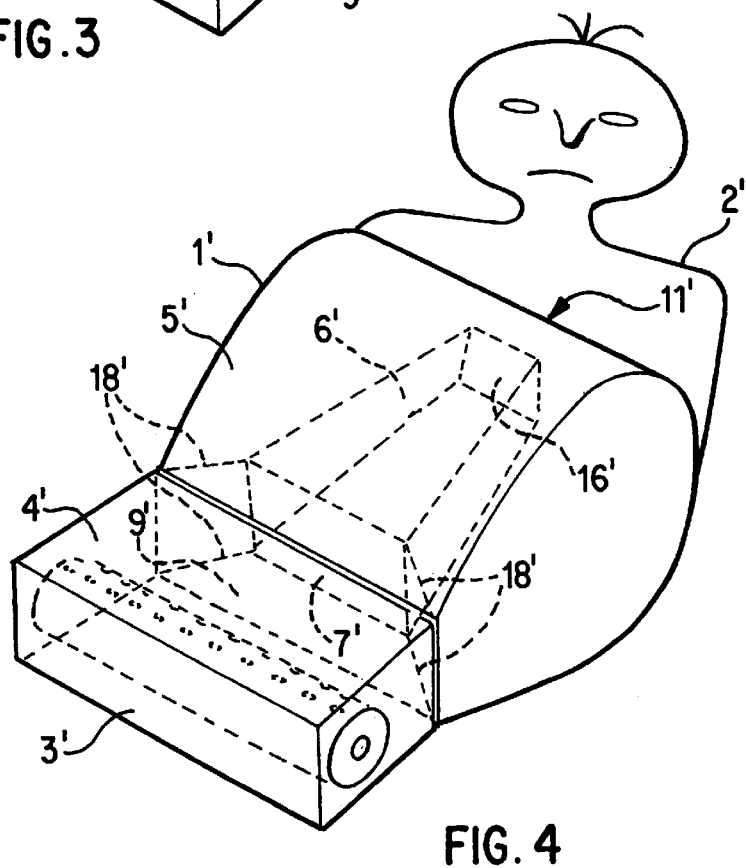
FIG. 4 shows another of an airbag sheath with a shorter inner airbag having an opening.
Figure 5:
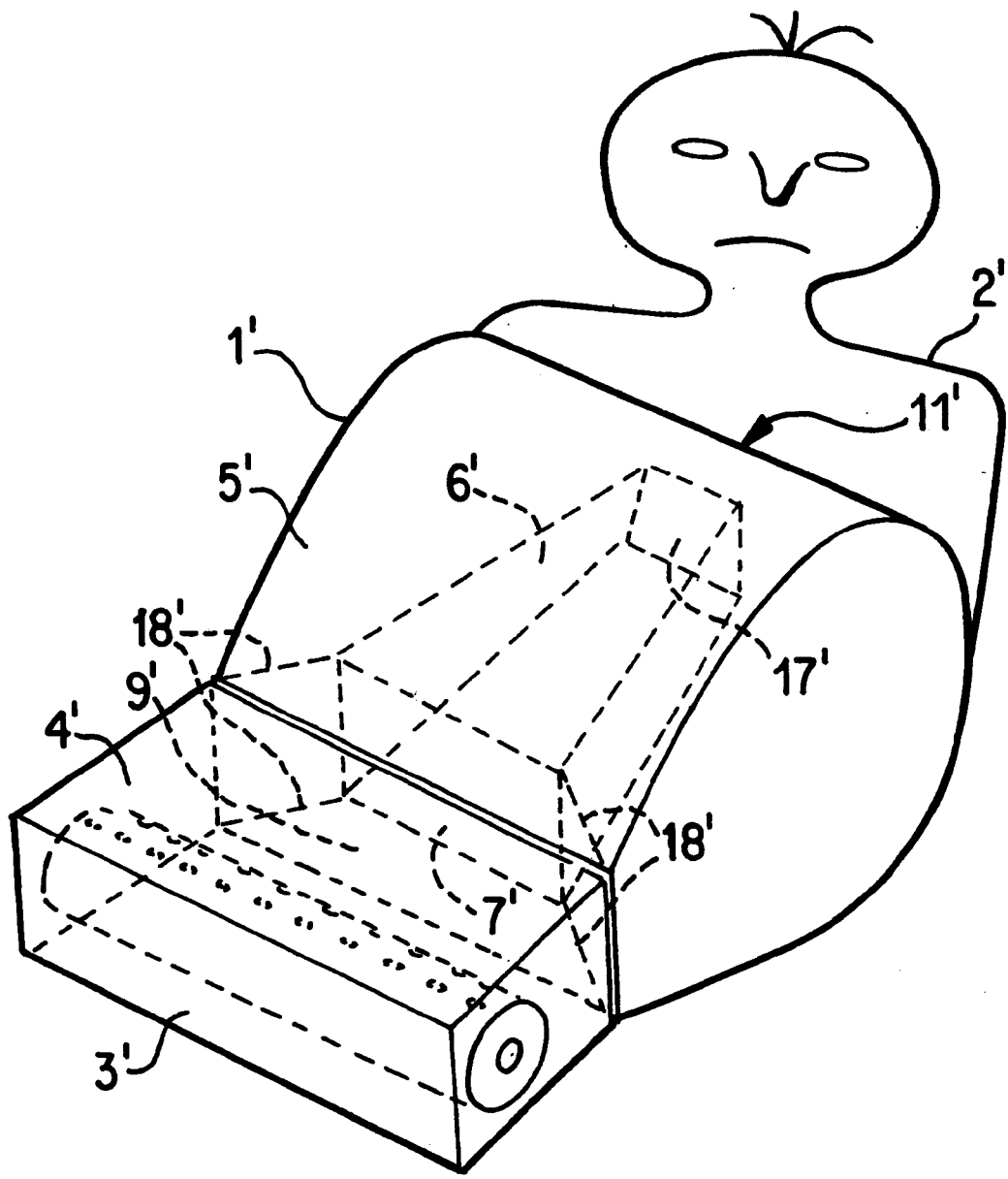
FIG. 5 shows an embodiment of an airbag sheath with a shorter inner airbag having a flat lid.

As shown in FIG. 4, inner airbag 6' can fulfill its function in filling rapidly with gas in a specific direction even if it stops before reaching impact surface 11' of airbag sheath 5 or has its inlet cross section 7' located at a distance from inlet cross section 9' of airbag sheath 5' and inside the latter. Inner airbag 6' therefore can also have a frustorconical shape or that of a truncated pyramid. The required internal pressure in inner airbag 6', despite an opening 16' shown in FIG. 4 in inner airbag 6', can be generated and maintained at the end that is close to the impact area. On the other hand, it can also be favorable for rapid filling to close inner airbag 6' with a flat lid 17' shown in FIG.5 that runs approximately perpendicularly to the length of inner airbag 6' and is fastened thereto, said lid being made of the same material. As far as utilization is concerned, therefore, locating inner airbag 6' near gas source 4' or near impact surface 11' of airbag sheath 5' where the impact occurs is possible by using a length that is shorter than the length of airbag sheath 5'. With such a design for inner airbag 6', restraints 18' that secure the latter can be advantageous. Further embodiments correspond to those shown in connection with FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An airbag for motor vehicles, comprising:
   an airbag sheath; and
   an inner airbag located centrally in said airbag sheath that is inflated before the airbag sheath and is designed by virtue of its shape for filling with gas in a specific direction,
   wherein the inner airbag has an elongated shape and a closed cross section that decreasingly tapers uniformly in a direction of a passenger, said cross section directing the gas flow in the direction of the passenger, and
   wherein the, inner airbag extends from an inlet cross section of the airbag sheath near a gas source to an opposite impact surface of the airbag sheath near a point of contact with the passenger.

2. Airbag according to claim 1, wherein an inlet cross section of the inner airbag for the gas flow relative to the filling volume of the inner airbag is larger than the corresponding ratio for the airbag sheath.

3. Airbag according to claim 1, wherein the inlet cross section where the gas flow enters the airbag sheath is smaller than an inlet cross section of the inner airbag.

4. Airbag according to claim 1, wherein the inner airbag is sewn to the impact surface of the airbag sheath near the point of contact.

5. Airbag according to claim 4, wherein the inner airbag is sewn to the airbag sheath along a circumferential seam.

6. Airbag according to claim 4, wherein the inner airbag is provided as a restraint for the airbag sheath.

7. Airbag according to claim 1, wherein the inner airbag is designed as a frustum of a cone.

8. Airbag according to claim 1, wherein the inner airbag is designed as a frustum of a pyramid.

9. Airbag according to claim 1, wherein the inner airbag has a rectangular shape at an inlet cross section.

10. Airbag according to claim 1, wherein the inner airbag is located coaxially in a lengthwise direction of the airbag sheath.

11. Airbag according to claim 1, wherein gas through-flow openings to allow gas to flow into the airbag sheath are provided in the inner airbag.

12. Airbag according to claim 1, wherein the inner airbag has at least one tear seam that tears under internal pressure and allows gas to flow into the airbag sheath.

13. Airbag according to claim 1, wherein the material of the inner airbag is designed to be gas-permeable above an internal pressure that can be predetermined.

14. Airbag according to claim 1, wherein the inner airbag is made of gas-permeable filter fabric.

15. Airbag according to claim 1, wherein the airbag is designed as a non-driver passenger airbag.

16. The airbag according to claim 1, wherein the inner airbag consists of exactly one inner airbag.

17. An airbag assembly disposable in use facing a vehicle passenger, comprising:

an inner airbag, an airbag sheath surrounding the inner airbag, and a gas generator providing inflating gas to the inner airbag and the airbag sheath, wherein the inner airbag is located centrally in said airbag sheath and has a smaller volume than an airbag sheath volume separate from the inner airbag and has a uniformly decreasing tapering closed cross-section in a direction toward the passengers, wherein the inner airbag extends from an inlet cross section of the airbag sheath near the (at generator to an opposite impact surface of the airbag sheath near a point of contact with the passenger.

18. An airbag assembly according to claim 17, wherein the inner airbag is sewn to said airbag sheath at a location corresponding to a contact area of the airbag sheath with a passenger.

19. The airbag assembly according to claim 17, wherein the inner airbag consists of exactly one inner airbag.

* * * * *